United States Patent Office 2,910,378
Patented Oct. 27, 1959

2,910,378

IMPROVED PROCESS FOR TREATING GLASS FIBERS WITH A WERNER TYPE CHROME COMPLEX

Frank B. Hauserman, Wilmington, Del., assignor to E. I. du Pont de Nemours and Company, Wilmington, Del., a corporation of Delaware No Drawing. Application March 19, 1957
Serial No. 646,963

4 Claims. (Cl. 117—54)

This invention relates to an improved process for preparing glass fiber-reinforced plastic structures. More particularly, it involves subjecting the glass fibers in separate steps to a chrome complex treatment and an alkaline treatment.

One method for modifying the surfaces of glass fibers in the preparation of glass fiber-reinforced plastic laminates is to apply a chrome complex to the fibers. This can be done while they are being formed as by wiping a solution of the complex on a multiplicity of the filaments as they are mechanically drawn from the melting furnace and collected into strands. These treated strands are then dried at elevated temperatures, washed in water to remove harmful salts and then again heated at elevated temperatures to dry the material prior to treatment with bonding resins. The preparatory treatment greatly improves the adhesion tension or bond strength between the bonding materials and the mineral fiber surfaces. The fiber modifying treatment, however, need not be applied at this point. A piece of heat-cleaned glass fabric prepared from the glass fibers may be treated with a chrome complex, heated to fix the material, washed to remove harmful salts and then again heated to dry the product prior to impregnation with the resin.

Chrome complexes are not substantive to glass unless after treatment the glass has been dried at an elevated temperature. Hence as described above, the glass was always dried after treatment with the chrome complex and prior to washing with water. If an attempt were made to wash the harmful salts out prior to drying the chrome complex it would be found that the chrome complex itself is washed away.

It has now been found that pretreatment of the glass fibers with an alkaline or basic material followed by the chrome complex treatment, or treatment of the glass fibers with a chrome complex followed by an alkaline treatment obviates the necessity for drying the fibers prior to washing since the chrome complexes are now substantive to glass. The elimination of the drying step simplifies the process and any detrimental effect of the heat on the reactivity of the coupling agents is eliminated. Resin laminates prepared from the surface-modified glass fibers of this invention possess the same outstanding strength even on exposure to moisture that was found in laminates prepared from glass fibers treated by the currently used process, namely, high temperature drying after chrome complex application.

Those skilled in the art understand that the term "substantive to glass" means that the complex is attached to the glass and will not wash off.

The basic solution for treating the glass fibers is preferably a nitrogenous base such as an organic amine, a quaternary ammonium compound or ammonia. Inorganic bases such as sodium silicate, sodium phosphate or sodium acetate can be used but are not preferred because of the harmful effect of the alkali metal ion. The organic groups of the amines and quaternary ammonium compounds may be aliphatic, alicyclic, aromatic, or heterocyclic.

The substituents on the nitrogen of the quaternary ammonium base may be all the same or may be different. Specific quaternary ammonium hydroxides which may be used are tetramethyl, tetraethyl, tetraisopropyl, tetra-n-propyl, dimethyldiallyl, tetraethanol, trimethylethanol, phenyltrimethyl, trimethylcyclohexyl, N-methylpyridinium, N,N-dimethylpiperidinium, and N,N-dimethylmorpholinium ammonium hydroxides.

The amine bases can be primary, secondary or tertiary amines having substituents on the nitrogen which may all be the same or may be different. Specific amines which may be used in the processes of our invention are those in which the substituents are mono-, di-, or trimethylamine, mono-, di- or triethylamine, mono-, di- or triisopropylamine, mono-, di- or tri-n-propylamine, mono-, di- or triisobutylamine: diethanolphenylamine, monocyclopropylamine, mono-, di- or triethanolamine. Also useful are pyridine, piperidine, morpholine, pyrazine and similar cyclic compounds in which the nitrogen is in the ring.

The basic wash solution can be applied to the glass fibers at the bushing immediately after the fibers are formed or the fibers may be in the form of fabric or mat, that is, woven, needled or spun. The amount of base in the basic wash solution used should be from 0.001 to 20% by weight of the complex in the complex treating solution, preferably 0.005 to 5%. The amount used will vary with the basicity of the amine and the amount of inorganic acid in the complex treating solution.

While the concentration of the basic treating solution can vary, normally a dilute solution is preferred. Thus the solution may have a concentration of base from 0.001 to 5%. The solution should have a pH of from 7.5 to 13.5.

The complex coupling agent used on the glass fibers in the method of the invention is a Werner type complex such as disclosed in U.S. Patents 2,544,666, 2,544,667, 2,544,668 and 2,733,182. The complex may be neutralized prior to use or it may be neutralized upon contact with the alkaline material on the fibers prior to treatment with the complex or applied to the fibers after treatment with the complex. If the chrome complexes are not neutralized prior to application to the fibers, additional alkaline agent must be added to the fibers so that there will be an amount not only sufficient to neutralize the complex agent but also sufficient to set the material and render it substantive to the glass fiber.

The Werner complex compounds suitable for use in the present invention are characterized by having therein associated with a trivalent nuclear chromium atom, an organic acido group such as a methacrylic acido group, an acrylic acido group, a resorcylic acido group or tannic acid groups. More specifically, the complexes can be methacrylato chromic chloride, acrylato chromic chloride, resorcylato chromic chloride, crotonato chromic chloride, sorbato chromic chloride, epsilon amino caproato chromic chloride. These and other Werner complexes are disclosed in the aforementioned patents as well as the methods of preparing such complexes and as such form no part of this invention.

As stated above, while the unneutralized Werner complexes can be used, it is much preferred to use a neutralized product as disclosed in U.S. Patent 2,733,182 especially since the neutralized product is much less corrosive.

The aqueous medium in which contact is effected between the glass fabric or fibers and the chrome complex consists preferably of deionized water. Alkali and alkaline earth metal salts are harmful and should be avoided if possible. Zeolite treated water may be used as well as any relatively salt-free water.

The Werner complex is neutralized by the addition of a nitrogen-containing base so that the aqueous solution is adjusted to an initial pH of from 4 to 7. Initial pH is that of the neutralized solution measured at 25° C. immediately after the nitrogen-containing base has been homogeneously distributed through the solution. The pH of the neutralized solution may drift downward as the solution ages, but this does not reduce the effectiveness of the treating solution. The organic bases which can be used for neutralizing the complex are the same as described for use in preparing the basic wash solution.

The preparation of a neutralized chrome complex solution is as follows: A suitable stock solution of the methacrylato chromic chloride is available commercially under the trade name "Volan" methacrylato chromic chloride. This proprietary product prepared according to the aforementioned U.S. patent contains about 20% methacrylato chromic chloride in which the methacrylate to chromium to chloride mole ratio is 1:2:4 in an isopropanol solution. The chromium content of this product averages about 6.0% by weight. This product is mixed with water to give a treating solution containing at least 0.5% but not more than 5% by weight of the stock methacrylato chromic solution; that is to say 0.1%–1% by weight of methacrylato chromic chloride complex.

It will be understood that aqueous treating solutions containing methacrylato chromic chloride can also be prepared by adding to water, methacrylato chromic chloride and solvents other than isopropanol. The methacrylato chromic chloride can be dissolved in any volatile water miscible neutral reacting organic solvent such as for instance methanol, acetone or ethanol and the resulting solution then added to water. Methacrylato chromic chloride may also be added directly to water although this is not a preferred practice.

The aqueous methacrylato chromic chloride treating solution is then neutralized with a nitrogen-containing base to an initial pH of from 4 to 7 measured at 25° C. and preferably to a pH in the range of from 5 to 6.

We have found that when neutralizing methacrylato chromic chloride treating solution it is preferred to employ a dilute aqueous solution of the nitrogen-containing base. With a more concentrated solution an insoluble precipitate may be formed during the addition of the nitrogen-containing base. A 1% aqueous solution of the nitrogen-containing base is especially preferred.

The nitrogen-containing base can be added at a reasonably fast rate so long as there is sufficient agitation to prevent formation of a permanent precipitate. The neutralized solution should be clear. A turbid solution should never be used for treating glass fibers.

The neutralized methacrylato chromic chloride solution and the alkaline treating solution may be applied to glass fibers by any suitable means such as dipping, wiping, or spraying, provided the fabric becomes thoroughly saturated.

After the solution has been applied to the fabric or fiber the excess may be removed by squeeze-roll, wiper bars or other practical means. The wet pick up should be kept to a minimum consistent with easy processing in order to hold impurities to a low level.

The concentration of chrome complex solution in the treating solution should be adjusted depending upon the wet pick up in order to apply the correct amount of complex to the fabric. When a wet pick up of 60–70% by weight is obtained with the glass fabric, the optimum concentration of methacrylato chromic chloride solution is 0.4% by weight. If the equipment used in applying the solution to the fabric is such that a higher wet pick up is obtained, then a proportionately lower concentration of chrome complex should be used. While the exact concentrations are not critical, 0.01–5% are normally used.

In treating the glass fibers the complex treating solution and the basic solution have to be continually replenished to maintain the concentration within the ranges set forth above. The basic wash solution can be applied before or after the chrome complex which can be neutralized or unneutralized, the fabric then preferably being washed and dried.

After both the alkaline and chrome complex treatments, the treated fiber or fabric can be dried on a conventional slasher in an oven or in any other conventional manner. For desired results, drying can be effected at room or elevated temperatures. Drying temperatures in the range of from 100–170° C. are preferred. Particularly preferred is a drying temperature of about 150° C. Excessive drying temperatures should be avoided.

Thorough washing of the treated fabric or fiber prior to drying to remove small amounts of water-soluble salts is a preferred practice although not essential. The presence of water-soluble salts definitely lowers the water-resistance of the bond between the treated fabric and the laminating resin.

Any suitable method may be used for washing the treated fabric. A continuous supply of fresh water is usually required. The chrome complex itself if applied in the manner described above will not be removed by the washing step, even though it has not been dried.

The final surface-finished glass fabric or fiber should contain from about 0.005–.07% by weight of chromium based on the weight of the dried fabric or fiber. Preferred amounts range from 0.02 to 0.05% by weight.

By impregnating the treated fabric with a resin such as for instance a low pressure polyester resin containing 1% benzoyl peroxide as a curing agent, a resin laminate can be fabricated. A sandwich containing 12 layers of resin impregnated fabric can then be formed and cured under pressure.

In addition to the polyester resin such materials as phenolics, polyamides and polyepoxide resins can be used. A preferred group of resins for use in our invention is the polyglycol esters of maleic or fumaric acid and mixtures of these polyesters with styrene.

When glass fabrics treated with methacrylato chromic chloride solution in the manner described above are incorporated with polyester materials in the manufacture of reinforced plastics and laminates, not only is the initial strength of the product extremely good but marked superiority is also shown when the laminated articles are tested under relatively high moisture conditions. The products of this invention can be characterized by their high degree of transparency and retention of their initially high flexural strength upon exposure to high humidities or immersion in water. The transparency of the laminated articles of the invention permits one to read through them with ease.

In order that the invention may be better understood reference should be had to the following illustrative examples.

*Example 1*

The preparation of methacrylato chromic chloride was carried out as follows:

A solution of a basic trivalent chromium salt having a basicity of 33⅓% was made by reducing the hexavalent chromium compound, chromic oxide ($CrO_3$), using isopropanol as the reducing agent. Thus, a solution of 33.6 parts by weight of chromic oxide in 66.4 parts of 36% hydrochloric acid was slowly added to a refluxing solution of 5.4 parts of hydrochloric acid in 94.6 parts of isopropanol. Analysis of the resulting solution showed 8.35% chloride, and 7.43% chromium. The Cl/Cr ratio was adjusted to 2:1 by the addition of 4.92 parts of hydrochloric acid.

Coordination of methacrylato groups with this basic trivalent chromium salt was effected by adding 4.97 parts of methacrylic acid and 9.26 parts of isopropanol to 85.76 parts of the basic chromic chloride solution. The isopropanol acted as a solvent in this step of the reaction. The solution was heated to reflux and allowed to cool. The resulting methacrylato chromic chloride contained 6% chromium and was soluble in water.

The treating solution for applying the methacrylato chromic chloride to the glass fabric was prepared by mixing 980 grams of water with 20 grams of the stock methacrylato chromic chloride solution described above. The pH of this solution was adjusted to a value of 5.9 with a dilute aqueous solution (1% active ingredient) of ammonia.

A sample of heat cleaned glass fabric, 181 weave (described in U.S. Air Force Specification No. 12051, August 3, 1949), was then immersed in the solution for a period of five minutes. The excess liquid was removed from the fabric by passing it through a rubber rolled hand wringer to give a 30% wet pick up.

The fabric was then treated with an aqueous ammoniacal solution having a pH of 9.9 (0.03% $NH_3$) for a period of 1 minute. The excess liquid was removed with a rubber rolled hand wringer and the fabric washed for 1 minute in pure water and then passed through a rubber rolled hand wringer. The fabric was then dried for a period of 10 minutes in an oven at a temperature of 150° C. The fabric was suitable for laminate preparation.

The laminates were prepared by impregnating the treated fabric with a low pressure polyester resin containing 1% benzoyl peroxide as the curing catalyst. A sandwich containing 12 layers of resin impregnated fabric was formed and cured under a pressure of fifteen pounds per square inch in a hydraulic press. The platens of the press were heated at such a rate that they reached a temperature of 60° C. after a period of 30 minutes, 80° C. after 45 minutes and 120° C. after 60 minutes. The laminate was then removed from the press.

The laminate was transparent and had a dry flexural strength (determined according to Federal specifications L-P-406a) of 63,000 lbs./sq. in. After the laminate was soaked for a period of three hours in boiling water, it had a flexural strength of 52,000 lbs./sq. in. (Untreated fabric gives a laminate with a wet flexural strength of 30-33,000 lbs./sq. in.)

The completed laminate was 0.137 inch thick and contained 41.4% resin.

*Example 2*

Glass fabric is treated as in Example 1, except the fabric is first soaked in a solution containing 0.03% $NH_3$ for 1 minute, wrung and then is soaked in a solution containing 0.4% methacrylato chromic chloride, the pH being adjusted to 5.5 with a 1/ piperidine solution. After wringing, the fabric is washed with water and dried at 100° C. A laminate prepared from this fabric and a polyester resin has a wet flexural strength of over 50,000 p.s.i.

*Example 3*

Glass fabric was treated exactly as in Example 1, except there was no treatment with a dilute ammonia solution after the methacrylato chromic chloride solution was applied. After washing the fabric, and then drying, substantially all the chromium complex was removed. The fabric gave a polyester resin laminate with a wet flexural strength of less than 35,000 p.s.i.

*Example 4*

Glass fibers are treated with methacrylato chromic chloride by wiping into the fibers directly below the bushing from which the fibers are drawn, a solution containing 1.0% of the methacrylato chromic chloride complex neutralized to a pH of about 5.5 with dilute ammonia, and then a solution containing 0.8% $NH_3$ is immediately wiped on the treated fibers. The fibers are then collected on a moving belt in the form of a mat, washed by spraying with water and dried. A laminate prepared from this mat and a polyester resin has about twice the wet flexural strength of one prepared from mat which is treated exactly the same except the basic treatment after the complex is applied is omitted.

This method of treatment can be varied by applying the basic treating solution to the fibers first and then applying the complex treating solution.

*Example 5*

Glass fabric is treated as in Example 1, except the pH of the methacrylato chromic chloride treating solution is not adjusted with $NH_3$ and the solution contains 35 grams of the stock complex solution in 1000 grams of water. After applying the complex, the fabric is wrung and then soaked in an aqueous ethylenediamine solution having a pH of 11.0 for 1 minute, wrung, washed and dried. A 12-ply laminate made from the treated fabric and a polyester resin had a wet flexural strength of more than 50,000 p.s.i.

*Example 6*

Glass fibers are treated as in Example 4, using a 2.0% solution of the 2,4-dihydroxybenzoato chromic chloride complex. After wiping the unneutralized complex treating solution into the fibers, a solution of tetramethylammonium hydroxide at pH 8 is applied. The fibers are collected in the form of a mat, washed and dried. A laminate prepared from the treated fibers and a phenolic resin has at least 30% higher wet flexural strength than one made from mat treated the same except the basic solution is not applied after the complex.

*Example 7*

Glass fabric is treated with a solution containing 0.5% of gallato chromic chloride complex, the pH of the solution being adjusted to 4.5 with a 5% morpholine solution. The fabric is then soaked in a solution of morpholine at pH 9 for one minute, washed and dried. A laminate made from this fabric and a phenolic resin has a substantially higher wet flexural strength than one prepared from fabric treated in the same way except no basic wash is used.

The same result is obtained when the gallato chromic chloride complex is replaced with the tannato chromic chloride complex.

*Example 8*

Heat-cleaned, needled glass mat is treated with a 1% solution of a glycinato chromic chloride complex solution, then is soaked for 1 minute in a 0.2% solution of hexamethlenetetramine, washed and dried. A laminate prepared from this mat and an epoxy resin has a wet flexural strength at least 25% greater than one prepared from a mat treated with the complex, washed and dried, omitting treatment with the basic solution.

*Example 9*

Glass fabric is soaked in a 0.05% solution of piperidine and then in a 0.4% solution of a p-aminobenzoato chromic chloride complex, the pH of the complex treating solution being adjusted to 4.5 with a 1% ammonia solution. The fabric is then washed and dried. A laminate made from this fabric and an epoxy resin has a wet flexural strength of more than 65,000 p.s.i. compared to about 50,000 p.s.i. for untreated fabric or fabric treated with the complex and washed, with no prior treatment with the basic solution.

*Example 10*

Glass fabric is treated with a 0.7% solution of the acrylato chromic chloride complex, the pH being adjusted to 5 with a 1% monomethylamine solution. The fabric is then soaked in an 0.02% solution of monomethylamine for 1 minute, washed and dried at room temperature. A laminate made from this fabric and a polyester resin has a wet flexural strength of over 50,000 p.s.i.

The same effect is obtained when the acrylato chromic chloride complex is replaced with the sorbato chromic chloride complex.

I claim:

1. Process for modifying glass fibers comprising treating the fibers with neutralized methacrylato chromic chloride followed by treatment with an aqueous ammoniacal solution to render the complex substantive to the fibers, said solution having a pH of from about 7.5 to 13.5 and washing the fibers prior to drying.

2. In a process for treating glass fibers wherein the fibers are contacted with a Werner type chrome complex, the improvement comprising treating the wet complex bearing fibers with a base selected from the group consisting of organic amines, quaternary ammonium compounds and ammonia, said basic treating solution having a pH of from about 7.5 to 13.5 whereby the complex becomes substantive to glass and then washing the fibers prior to drying.

3. The process of claim 2 in which the Werner type complex has been neutralized prior to its application to the fibers, and washing the fibers prior to further treatment.

4. In the process for treating glass fibers with a Werner type chrome complex, the improvement comprising contacting the fibers first with a base selected from the group consisting of organic amines, quaternary ammonium compounds and ammonia at a pH of from about 7.5 to 13.5 and then with the Werner type chrome complex whereby the complex becomes substantive to the glass and then washing the fibers prior to drying.

References Cited in the file of this patent

UNITED STATES PATENTS

| | | |
|---|---|---|
| 2,700,010 | Balz | Jan. 18, 1955 |
| 2,733,182 | Dalton et al. | Jan. 31, 1956 |

UNITED STATES PATENT OFFICE
CERTIFICATE OF CORRECTION

Patent No. 2,910,378                                                      October 27, 1959

Frank B. Hauserman

It is hereby certified that error appears in the printed specification of the above numbered patent requiring correction and that the said Letters Patent should read as corrected below.

Column 4, line 34, after "containing" insert -- say --; column 5, line 53, for "1/" read -- 1% --.

Signed and sealed this 17th day of May 1960.

(SEAL)
Attest:

KARL H. AXLINE                                                   ROBERT C. WATSON
Attesting Officer                                            Commissioner of Patents